SCANNING CIRCUIT EMPLOYING SHIFT REGISTERS

Filed June 15, 1965 Sheet 1 of 4

INVENTORS. U. F. GIANOLA
R. A. KAENEL
H. E. D. SCOVIL
BY Herbert M. Shapiro
ATTORNEY United States Patent Office 3,430,001

Patented Feb. 25, 1969

3,430,001

SCANNING CIRCUIT EMPLOYING SHIFT REGISTERS

Umberto F. Gianola, Florham Park, Reginald A. Kaenel, Chatham, and Henry E. D. Scovil, New Vernon, N.J., assignors to Bell Telephone Laboratories, Incorporated, New York, N.Y., a corporation of New York Filed June 15, 1965, Ser. No. 464,066

U.S. Cl. 179—18 19 Claims

Int. Cl. H04m 3/00

ABSTRACT OF THE DISCLOSURE

A telephone scanning circuit is described where only differences between binary indications of substation line conditions in consecutive scan periods are supplied to a central processor for controlling service to the substations. All lines of a set are scanned simultaneously in a first scan cycle. The resulting first indications are stored in a shift register and advanced to later stages. A next consecutive scan cycle results in the storage of second indications in the shift register. Logic circuitry provides first and second signals indicative of first and second differences in the indications for consecutive cycles for each line as information is advanced in the register. The difference signals are supplied to the central processor along with synchronized sequentially generated line address information for controlling service.

Scanning circuits are encountered in telephone systems where they are used, for example, to monitor the condition of telephone subscriber lines. This invention relates to such scanning circuits used advantageously, but not necessarily, in a telephone system context.

Service is provided to a telephone subscriber in response to changes in condition of the subscriber line. There are two conditions for those lines of interest here. The first condition is an idle condition identified usually by the absence of current in an auxiliary line connected to each telephone line. This condition is termed the "on-hook" condition. The second condition is a service-request condition identified usually by a current flowing in that auxiliary line. This current is termed the "off-hook" current and the condition is termed the "off-hook" condition. Each subscriber line is associated, as is well known, with what is termed a "scan point" at which indications of the line condition are provided. The function of a scanning circuit, then, may be described as that of scanning a number of scan points and reporting changes in the electrical condition of associated lines in response to the presence or absence of off-hook currents.

One circuit designed to perform the scanning function includes, for example, a memory array comprising a "translator" core and a "memory" core associated with each scan point. Such cores are usually magnetic storage cores driven in a conventional matrix arrangement by horizontal and vertical drivers. Thus, in response to each signal applied by those drivers a single translator core is switched providing a pulse for interrogating the associated scan point corresponding to a particular line. The translator thus serves the function of an access switch and operates in response to external energization to access sequentially all lines associated therewith. An interrogated scan point provides a signal only if it is in the off-hook condition when interrogated.

The memory core is coupled to the translator core by a transfer loop to provide a "sense" indication, in response to a switching translator core, depending on the previous state of the former. To this end, the state of the memory core is determined conveniently by controlling, via off-hook currents, the length of time during which the drive pulses for the translator core are relaxed. Such an arrangement is described in copending application Ser. No. 333,025, filed Dec. 24, 1963, for W. T. Hartwell, R. Klahn and H. R. Shaffer, now Patent 3,349,230, issued Oct. 24, 1967. The translator core, then, is switched to the same magnetic direction each time by the drive pulses and is relaxed to the opposite magnetic direction conveniently under the influence of a bias. Thus the memory core always is driven in the same direction and in being so driven functions to provide an output pulse only when a scan point interrogated in the next preceding cycle had permitted the translator core to relax sufficiently quickly to cause resetting of the memory core.

The output from the scan point and the output of the corresponding memory core are fed into present and past look detectors synchronized with an address generator controlling sequential energization of the translator cores. The synchronized outputs of these detectors are fed into a comparator which detects a match or mismatch therebetween. A mismatch operates to stop the address generator which, in turn, feeds the corresponding address into a message formulator. The message formulator also receives a representation of the present state of the scan point from the comparator. A system of the foregoing type is disclosed in application Ser. No. 195,199, filed May 16, 1962, for R. C. Gebhardt, W. L. Shafer, Jr., A. E. Spencer, W. N. Toy, F. S. Vigliante, R. D. Williams, and O. H. Williford, now Patent 3,225,144, issued Dec. 21, 1956.

It is an object of this invention to provide a new and novel scanning circuit.

It is another object of this invention to provide a scanning circuit arrangement wherein each scan point need not be interrogated on an individual basis and, consequently, wherein the services of a translator memory matrix are unnecessary.

The above and further objects and features of this invention are realized in one embodiment thereof wherein a plurality of auxiliary telephone lines are directly coupled to a propagation medium defining scan points at different positions therein. Periodically, all the scan points are preset to unstable conditions at one time, stable conditions being set in particular positions therein only when off-hook currents appear on the associated lines at that time. The stable conditions are propagated along the medium to a detector before unstable conditions are again preset at all the scan points. The detector provides an output pulse in response to the arrival of each stable condition there. Each output pulse gates a sequentially changing output of an address generator providing an address for the line associated with the corresponding position of the scan point in the medium. Means responsive to an output pulse and an address indicates the service required for that associated line.

It is believed that the coupling of telephone lines to what is, essentially, a present look store for defining scan points therein, and the simultaneous activation of all scan points so defined for permitting first storage and then sequential generation of indications of the condition of all associated telephones as the addresses for those telephones are independently generated, is a departure from prior art thinking.

Accordingly, a feature of this invention is a line scanner wherein each line is coupled to a propagation medium for defining scan points therein.

Another feature of this invention is a scanning circuit including means for simultaneously activating all scan points associated therewith.

Another feature of this invention is a scanning circuit including means for simultaneously establishing in a propagation medium stable indications of the condition of all lines associated therewith.

A further feature of this invention is a scanning circuit comprising means for propagating along a propagation medium the stable indications of the conditions of all the lines associated therewith.

The above and further objects and features of this invention will be more fully understood from a consideration of the following detailed description rendered in conjunction with the accompanying drawing in which.

Figure 1:
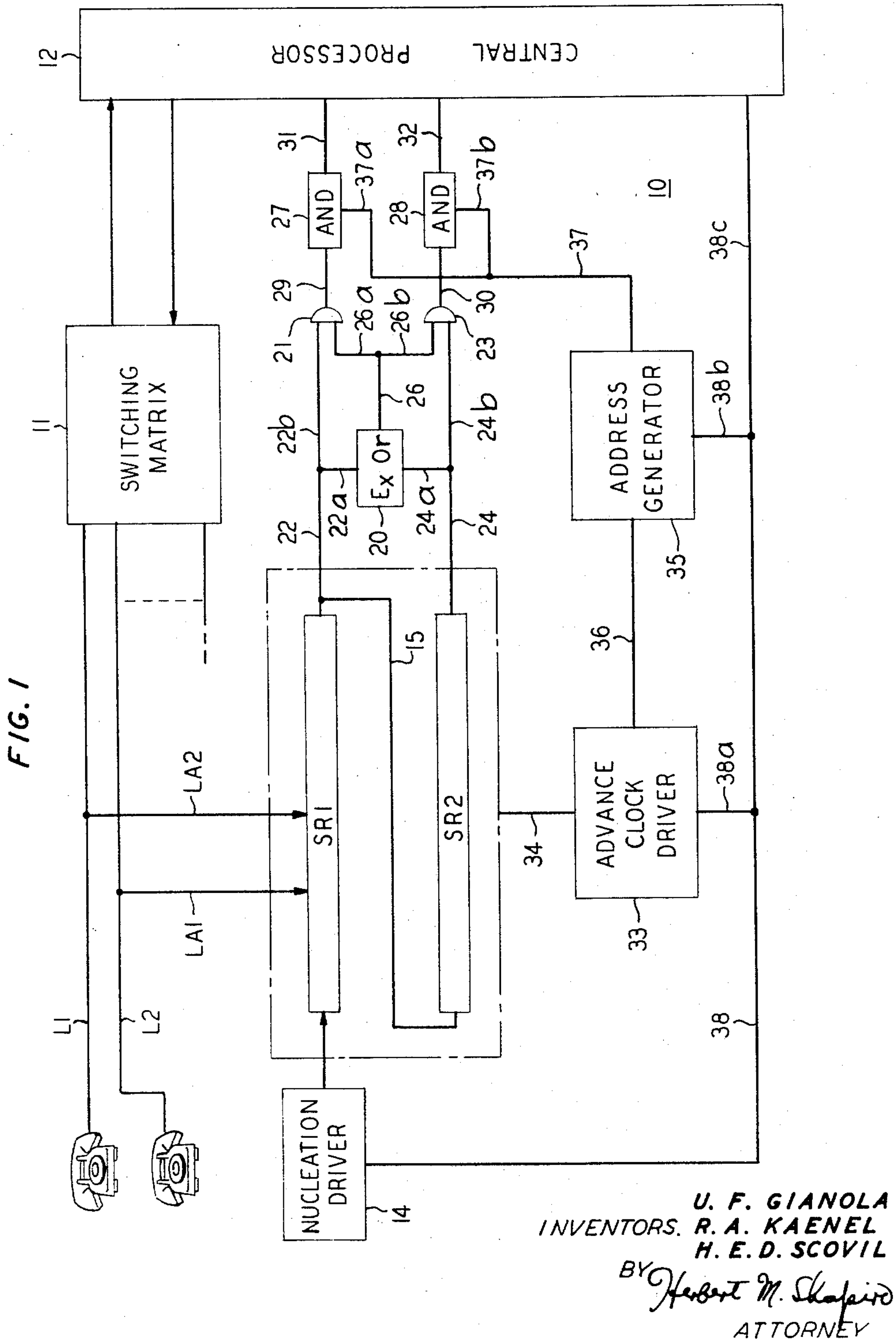
FIG. 1 is a schematic representation of a scanning circuit in accordance with this invention.

FIG. 1 shows an illustrative scanning circuit 10, in accordance with this invention, in the context of a telephone system. The figure shows two telephones, illustratively, connected to a conventional telephone switching matrix 11 by telephone lines L1 and L2. The telephone switching matrix is under the control of a central processor 12 as is well known. Applicants' scanning circuit herein operates as a supervisory circuit to supply an existing central processor with information as to the service required on the telephone lines serviced thereby. This information is conventionally supplied responsive to electrical conditions on auxiliary lines connected to the telephone lines. The auxiliary lines are designated LA1 and LA2 herein and are coupled directly to a domain wall shift register SR1 at various positions therealong.

The basic domain wall shift register is well known and will be described briefly hereinafter. At this juncture, however, it is sufficient to state that a domain wall shift register comprises a magnetic medium, for example, a wire. A "nucleation" driver 14 is coupled to that medium at prescribed positions along its entire length, and the output of the shift register, to the right as viewed in the figure, is connected via a conductor 15 to a second domain wall shift register SR2.

The output of shift register SR1 also is connected to an EXCLUSIVE-OR circuit 20 and to an AND gate 21 via a conductor 22 connected to conductors 22*a* and 22*b*, respectively. Similarly, shift register SR2 is connected to EXCLUSIVE-OR circuit 20 and to an AND gate 23 by a conductor 24 connected to conductors 24*a* and 24*b* respectively. The EXCLUSIVE-OR circuit 20, in turn, is connected to AND gates 21 and 23 by a conductor 26 connected to conductors 26*a* and 26*b*, respectively. The AND gates 21 and 23 are connected to AND circuits 27 and 28, respectively, by conductors 29 and 30. The AND circuits 27 and 28, in turn, are connected to the central processor 12 via conductors 31 and 32, respectively. The various logic circuitry and the connections therebetween are indicated in FIG. 1 merely as blocks and conductors, respectively. It is to be understood that these blocks and conductors are merely representative of particular functions and are not necessarily meant to illustrate specific circuitry. The logic elements and the connections therebetween, however, are well known and will be discussed hereinafter on a functional basis, the structure thereof being described only inasmuch as it may differ from the most simple logic circuitry of like function.

An advance clock driver 33 is coupled to shift registers SR1 and SR2 via representative conductor 34. Also, advance clock driver 33 is connected to an address generator 35 via a conductor 36. Address generator 35, in turn, is connected to AND circuits 27 and 28 via a conductor

37 connected to conductors 37*a* and 37*b*, respectively. Nucleation driver 14 is connected to advance clock driver 33, address generator 35, and to the central processor 12 by a representative conductor 38 connected to conductors 38*a*, 38*b*, and 38*c*.

An understanding of a domain wall shift register, its structure, and the adaptations thereof in accordance with this invention is helpful in appreciating the operation of the circuit of FIG. 1. Accordingly, one such shift register and the adaptations therefor are discussed before preceding with a consideration of that operation.

Figure 2:
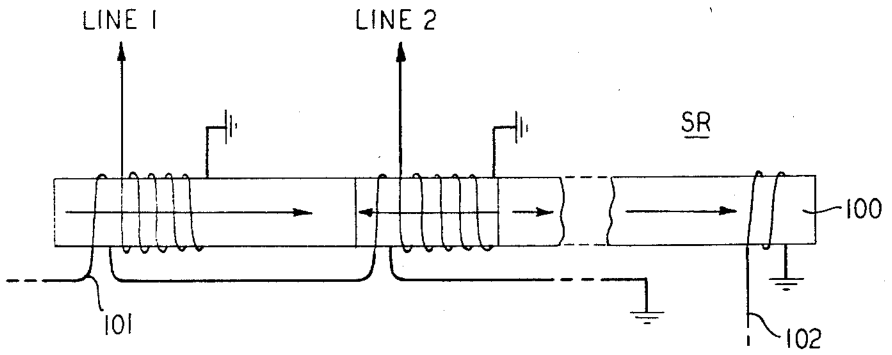
FIGS. 2 and 4 are schematic representations of portions of the circuit of FIG. 1.

A simplified domain wall shift register SR is shown in FIG. 2. The shift register comprises an elongated magnetic wire 100 about which a narrow electrical conductor 101 is coupled at spaced apart positions therealong. The conductor 101 is connected between a driver (not shown), for example driver 14 of FIG. 1, and ground. In accordance with this invention, input lines, for example auxiliary telephone lines LA1 and LA2 of FIG. 1, are coupled to the magnetic wire 100 at the above-noted positions therealong. A sense conductor 102, coupled to the right end of magnetic wire 100, as viewed in the figure, is connected between a utilization circuit (not shown), for example to EXCLUSIVE-OR circuit 20 of FIG. 1, and ground.

As is frequently the case with well known magnetic wire domain wall shift registers, the magnetic wire 100 is itself helically wrapped about an elongated nonmagnetic mandrel or core. Two overlapping serpentine-like propagation conductors are arranged such that elongated sections thereof, oriented along the axis of the mandrel, are connected by short sections oriented axially about the mandrel. Pulses are applied alternately to the first conductor, then to the second, to step a reverse magnetic domain of stable length along the magnetic wire 100. The overlapping conductors for this purpose are well known and are not shown here. A driven such as the advance clock driver 33 of FIG. 1 provides the alternate pulses thereto.

The magnetic wire for such shift registers typically comprises a ferromagnetic material having a re-entrant substantially rectangular hysteresis characteristic. Such materials exhibit a stable flux state, called either a reverse domain or a stable scan point condition in the parlance of telephone scanning circuitry herein when a field in excess of its nucleation coercive force is applied over a wire segment of sufficient length. A stable reverse domain in a magnetic wire is indicated herein by an arrow directed to the left as is shown in wire 100 in FIG. 2 and is further explained in connection with FIG. 6. Since such domains and their formation are well understood, a discussion thereof herein is dispensed with. The normal condition of the wire is indicated herein by an arrow directed to the right also as discussed further in connection with FIG. 6. Once the stable reverse domain is established, the domain is propagated along the magnetic wire conveniently by a relatively low amplitude polyphase propagation field generated by the pulses applied to the propagation conductors as is well known. Propagation along the magnetic wire is in the direction of the sense conductor and the sense conductor provides an output pulse for each reverse domain arriving thereat. Actually, a pulse is produced for each boundary of the reverse domain. Only the pulse for the forward boundary, to the right as viewed in FIG. 2, is utilized in the illustrative embodiments.

The conductor 101 of FIG. 2 is pulsed periodically by a driver such as driver 14 of FIG. 1. The pulse is chosen, in accordance with this invention and in contradistinction with prior art teaching, such that it alone cannot provide a stable reverse domain anywhere along magnetic wire 100. Also, in accordance with this invention, if at the time driver 14 pulses conductor 101, an off-hook current appears in one of the auxiliary telephone lines, a stable reverse domain is provided in the corresponding portion of the magnetic wire 100. Accordingly, the pulse supplied by driver 14 plus the off-hook current in an auxiliary telephone line produce fields which together create a magnetic domain over a stable length of the magnetic wire at the corresponding portion thereof. Importantly, no stable reverse domain is formed if either the field is of insufficient magnitude or, alternatively, if a field of sufficient magnitude is generated over an insufficient length of wire. Both cases are contemplated; only the latter is described. To this end, conductor 101 is chosen of a geometry such that a suitable pulse therein nucleates a reverse domain of an unstable length in the corresponding portion of magnetic wire 100. In this instance, a coincident off-hook current, producing a field that exceeds the propagation field, acts to expand the reverse domain to a stable length. This mode of supplying coincident fields is similar to that described for a memory matrix in copending application Ser. No. 206,208, filed June 29, 1962 for U. F. Gianola, now Patent 3,286,242 issued Nov. 15, 1966.

In accordance with the foregoing discussion, the entire magnetic wire, for example as in shift register SR1 of FIG. 1, is activated in response to a pulse in conductor 101 such that coincident off-hook currents in lines directly coupled thereto provide indications, in terms of the presence and absence of stable reverse domains, of the line conditions of all the telephones connected thereto. Shift register SR1, therefore, functions as a present look store in conventional scanner circuitry. As is evident from a discussion of the operation of the circuit of FIG. 1 hereinafter, a similar shift register used as shift register SR2 in the circuit of FIG. 1 functions as a last look store.

It is convenient to mention, at this juncture, that shift register SR2 is advantageously also a domain wall shift register of the type just described, as is apparent from a consideration of the structure of such a shift register. Specifically, a second shift register of a domain wall type is provided merely by wrapping a second magnetic wire helically about the nonmagnetic mandrel about which wire 100 is wrapped or, alternatively, by merely continuing wire 100 beyond the point at which the sense conductor is coupled. If a second wire is used it is sufficiently removed from wire 100 such that there is no interaction therebetween and an amplifier (not shown) is connected between the output of the first and the input of the second wire. The second wire is provided with conventional input and output conductors to the latter of which, for example, EXCLUSIVE-OR circuit 20 of FIG. 1 is connected. The propagation circuitry for magnetic wire 100 may be shared. A continuation of wire 100 need only have an additional sense conductor which is connected, for example, to EXCLUSIVE-OR circuit 20.

The operation of the circuit of FIG. 1 may now be understood in terms of the operation of a simple domain wall shift register adapted for parallel input coincident current operation with serial output in accordance with this invention. In operation of the circuit of FIG. 1 then, nucleation driver 14 periodically applies a nucleation pulse (to conductor 101 of FIG. 2) for nucleating reverse domains of unstable lengths (that is to say, for presetting unstable scan point conditions) along the entire magnetic wire of shift register SR1. Each telephone auxiliary line in the off-hook condition when that nucleation pulse is applied is characterized by an off-hook current which generates a field in coincidence with that of the nucleation pulse for expanding to stable lengths those reverse domains in the corresponding portions, that is, scan points, of shift register SR1. The nucleation driver, with the provision of each pulse, signals the advance clock driver 33 to initiate a sequence of propagation pulses, and, in addition, signals the address generator to generate sequentially the addresses of all telephones associated with the shift register (from right to left as viewed in the figure) and then to stop. The nucleation driver as well as advance clock driver 33 and address generator 35 are under the control of central processor 12.

In response to the propagation pulses, stable reverse domains, that is, stable scan point conditions, are propagated through the shift register SR1 to provide pulses at the output (sense conductor) thereof as the address corresponding to the appropriate telephone line is generated by the address generator. The output of shift register SR1 is passed into shift register SR2. When shift register SR1 is free of stable reverse states and shift register SR2 includes those stable reverse states, a next nucleation pulse is applied by driver 14 under the control of the central processor 12. The stable reverse states next stored in shift register SR1 result from off-hook currents in coincidence with this next nucleation pulse. The stable reverse states in shift register SR2 are those stored in shift register SR1 during the previous nucleation pulse. Accordingly, shift register SR1 functions as a present look store and shift register SR2 functions as a last look store.

Importantly, there is no output from shift register SR2 until the contents of register SR1 are propagated through it. As shift register SR1 empties into register SR2, the former also produces an output pulse for each stable state stored there. The shift registers normally include no reverse domains unless such are deliberately stored there. Thus, in the initial operation shift register SR2 includes no such domains and propagation of such domains from shift register SR1 produces mismatches between the outputs of the two registers as follows: The outputs of the shift registers SR1 and SR2 are compared to provide an output only when there is a change in the condition of a corresponding auxiliary telephone line. Specifically, if there is a stable reverse domain in shift register SR1 and no reverse domain in the corresponding position of shift register SR 2, the corresponding telephone is assumed to have gone to an off-hook condition and service is required. If the opposite situation exists, the corresponding line no longer requires service. In the initial operation, that is, in response to the propagation pulses following the first nucleation pulse from driver 14, the latter situation is not indicated. If the corresponding positions in the two registers have like indications, no service is required for the corresponding line. If an output corresponding to the arrival of a stable reverse domain (the forward boundary thereof) at the output of a shift register is represented as a "1," and the absence of such an output is represented by "0," then Table I summarizes the possible combinations of outputs from shift registers SR1 and SR2.

TABLE I

| | | | | |
|---|---|---|---|---|
| SR1 | 0 | 1 | 0 | 1 |
| SR2 | 0 | 0 | 1 | 1 |

The outputs of both shift registers are applied to EXCLUSIVE-OR circuit 20 of FIG. 1 which, in turn, applies an output pulse to AND gates 21 and 23 only when the outputs of the shift registers are mismatched, that is, under the condition represented by either of columns 2 and 3 of Table I. In addition, the output of shift register SR1 is applied to AND gate 21 and that of shift register SR2 is applied to AND gate 23. The AND gate 21 applies a pulse to AND circuit 27, then, only if a mismatch appears between the output of the two shift registers and shift register SR1 produces an output. This condtion indicates that a line just went off-hook. The output of address generator 35 also is applied to AND circuit 27. Consequently, AND circuit 27 functions to gate an address to the central processor 12 when shift register SR1 provides an output pulse at the corresponding time and there is a mismatch between the outputs of the shift registers at that time. The pulse provided by AND circuit 27 is an indication that service is required for the telephone the address of which is gated through the AND circuit 27 at that time. Similarly, when a mismatch occurs and shift register SR2 provides an output pulse, AND circuit 28 gates through the address of the corresponding telephone indicating that a call is complete. In this connection, AND circuits 27 and 28 serve as message formulators. Central processor 12 includes well known equipment for controlling switching matrix 11 in response to a signal from either AND circuit 27 or 28.

Figure 3:
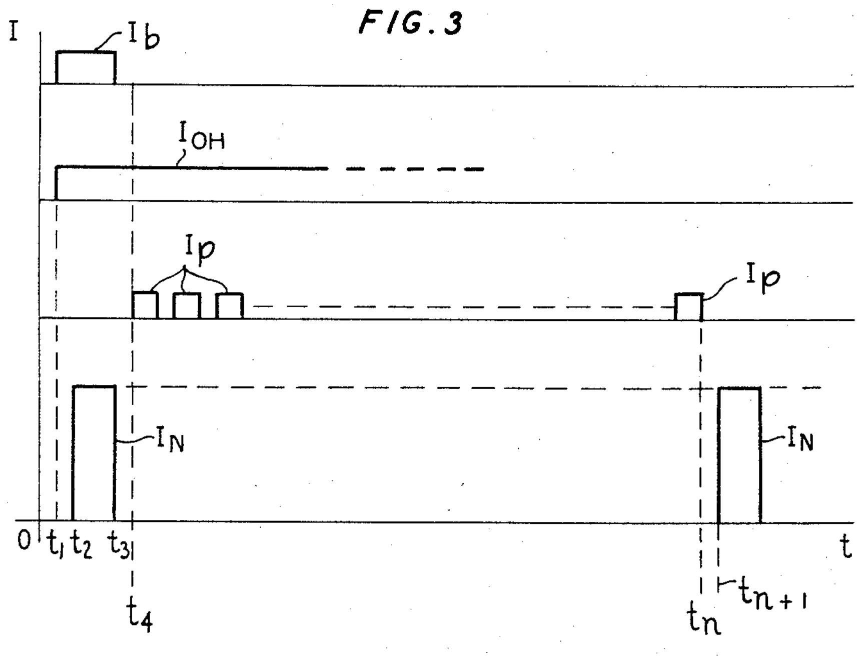
FIG. 3 is a pulse diagram of the currents applied during the operation of the circuit of FIG. 1.

FIG. 3 is a pulse diagram summarizing the current pulses applied to the circuit of FIG. 1, as a function of time, during operation thereof. Let us assume that a number of lines corresponding to selected scan points go off hook at a time designated $t_1$ providing off-hook currents designated $I_{OH}$. At an arbitrary later time $t_2$ to $t_3$ a nucleation pulse, designated $I_N$, is applied. The pulses $I_N$ and $I_{OH}$ add to generate fields at the selected scan points for providing reverse domains of stable length there. At a later time designated $t_4$ through $t_n$, a sufficient number of propagation pulses, designated $I_p$, are applied to clear the register, that is to move the reverse domains to where the sense conductor is coupled to the magnetic wire. At a still later time, designated $t_{n+1}$, a next nucleation pulse is applied.

This pulse diagram also shows a representative off-hook current $I_{OH}$ continuing beyond time $t_3$ at which the nucleation pulse terminates. When the propagation pulses $I_p$ are applied, the field generated at the selected scan point is commensurate with the pulse $I_{OH}$ in addition to the pulse $I_p$. The amplitudes of these pulses are relatively small, less than one third that of the nucleation pulse, typically one tenth thereof, as shown in the figure to insure that no additional reverse domain is provided at that scan point in the absence of a nucleation pulse. A tendency to increase propagation speeds because of the increased fields has negligible effect on the system operation because of the well known step-along nature of the fields generated by the alternatingly pulsed propagation conductors.

A pulsed bias current $I_b$ may be applied (conveniently via conductor 34 of FIG. 1) concurrently with the nucleation pulse, permitting a reduction of the off-hook current $I_{OH}$ needed to expand nucleated domains to stable lengths. Importantly, each of the off-hook currents and the propagation currents produce fields over a length of the magnetic wire at least corresponding to the length of a stable domain. This is also true of the pulsed bias current $I_b$. The nucleation field is restricted, in the described embodiment to a relatively short length of the magnetic wire less than the length of a stable reverse domain. The pulsed bias current is of an amplitude less than the minimum current required to generate a propagation field and serves only to permit the use of smaller off-hook currents and therefore to minimize the effect of variations in those currents. The circuits of FIGS. 1 and 2 are particularly adaptable to telephone systems such as electronic private branch exchanges (EPBX) where variations in off-hook currents are relatively small.

The various drivers, amplifiers, delay lines, logic circuits and other elements may be any elements capable of operating in accordance with this invention. It is evident that AND circuits 27 and 28, for example, are not the most simple type of AND circuits as are AND gates 21 and 23. The former two circuits, however, comprise a plurality of the more simple type of AND circuit each of which is responsive to an output of address generator 35 corresponding to one bit of an address generated and to a coincident signal from AND gates 21 and 23, respectively. The details of this arrangement are shown in FIG. 4.

Figure 4:
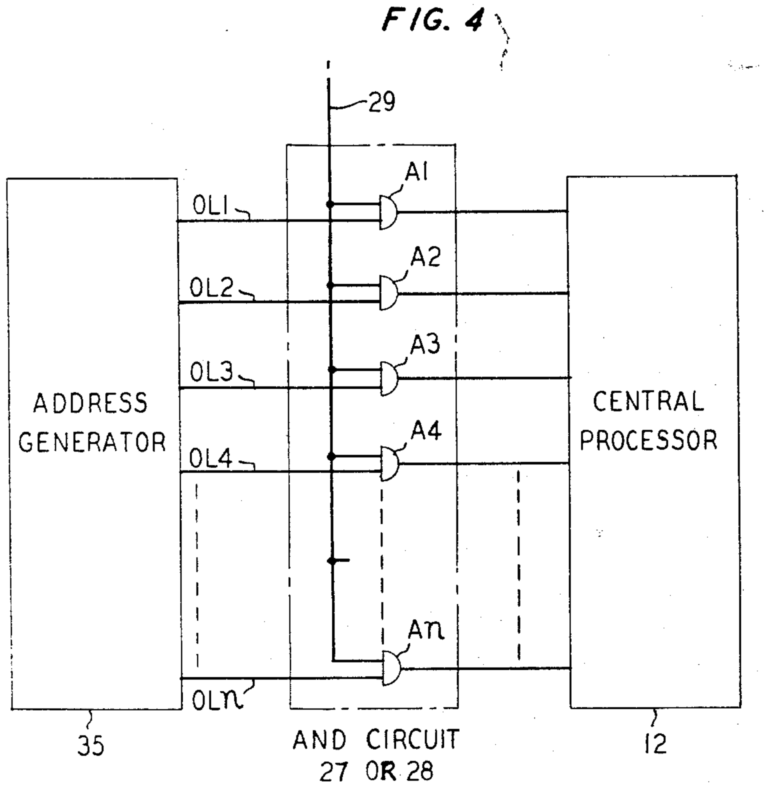

FIG. 4 shows address generator 35 with a plurality of outputs OL1 through OL*n* where *n* corresponds to the number of bits in the address. Each output connects to a corresponding AND gate A1 through A*n*, respectively. Conductor 29 of FIG. 1, for example, has a connection to each of these AND gates A1 through A*n* which connections and circuits are represented in FIG. 1 as a block designated 27 (and 28). The parallel output of the AND circuits A1 through A*n* is conducted to central processor 12 via representative conductor 31 (and 32).

It may be appreciated from FIG. 2 that the distance between the portion, that is, scan point, of magnetic wire 100 and the sense conductor coupling is different for each telephone auxiliary line. In effect, each line is connected to a shift register of different length. The shift registers of FIG. 1 may actually be built in this manner with each telephone line coupled to a magnetic wire of different length. Such an arrangement permits keeping the magnetic wire strongly biased into saturation except during the interval when the nucleation pulse is applied. An illustrative multiwire arrangement is discussed hereinafter in connection with FIG. 5.

Figure 5:
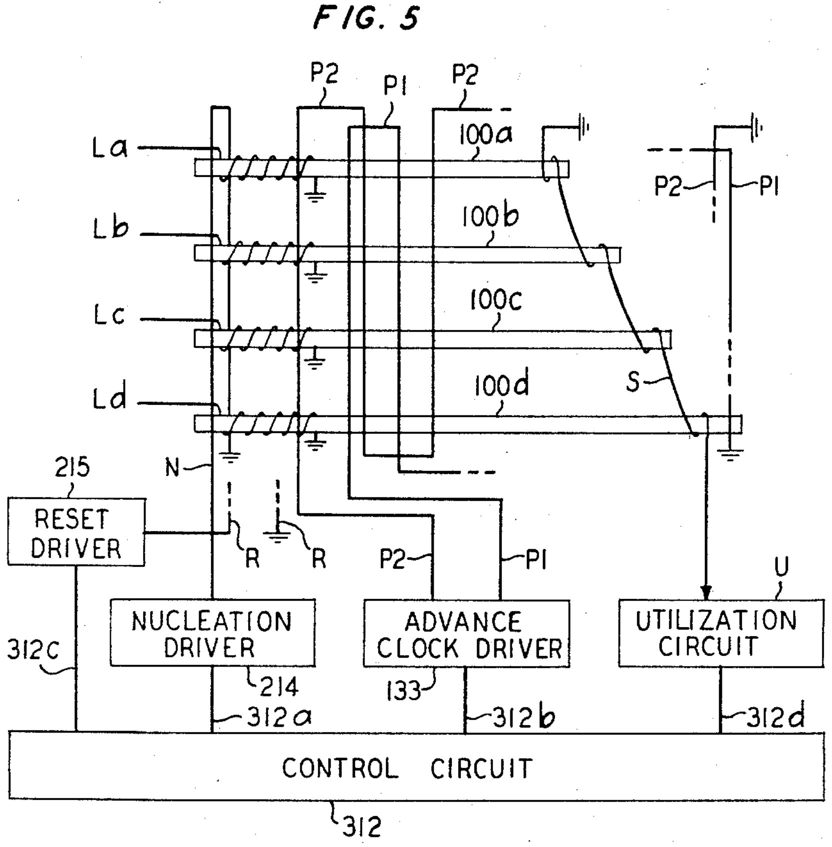
FIG. 5 is a schematic representation of an arrangement alternative to a portion of the circuit of FIG. 1.

Another embodiment in accordance with this invention employs the shift register arrangement shown in FIG. 5. The embodiment is illustrative of a multiwire arrangement including magnetic wires of different lengths and operates, accordingly, in a manner similar to that described hereinbefore, differing therefrom in the manner of storing information. Included in the shift register are overlapping serpentine-like conductors P1 and P2, arranged transverse to the magnetic wires, and connected between advance clock driver 133 and ground. Illustratively, four magnetic wires of different lengths are shown. These are designated 100*a* through 100*d*. Individual lines designated L*a* through L*d* are coupled to corresponding magnetic wires. A "nucleation" conductor N, connected between a nucleation driver 214 and ground, couples all the magnetic wires. A "reset" conductor R, only indicated in FIG. 5 (for purposes of clarity), couples the magnetic wires over the length thereof coupled by both the nucleation conductor and the lines. The reset conductor is connected between a reset driver 215 and ground. A sense conductor S, serially coupling all the magnetic wires at a remote end (to the right as viewed in the figure) is connected between a utilization circuit U and ground. The nucleation and advance clock drivers as well as the reset driver and the utilization circuit are connected to a control circuit 312 via conductors 312*a*, 312*b*, 312*c*, and 312*d*, respectively. In this connection, the various drivers and circuits may be any such elements capable of operation in accordance with this invention.

In the operation of the circuit of FIG. 5, nucleation driver 214 applies a nucleation pulse to nucleation conductor N, under the control of control circuit 312, which pulse reverses flux in the coupled portion of each wire providing stable reverse domains there. Off-hook currents in ones of the lines L*a* through L*d* coincident with that nucleation pulse are coupled in a manner to expand existing stable reverse domains to the right as viewed in the figure. The propagation conductors P1 and P2 are arranged such that the polyphase field produced in response to alternate pulses applied thereto by advance clock driver 133 is spaced apart from unexpanded stable reverse domains. In this manner, unexpanded reverse domains are not propagated by the propagating fields while expanded ones are so propagated. The manner and amount of expansion of reverse domains by the propagation field are consistent with that provided by the first phase of the well known polyphase propagation field. As is well known, that polyphase field expands the reverse domain to the right (as viewed in the figure) during a first phase, then not only expands it to the right but also contracts it from the left during the later phases. In the present embodiment, the initial reverse domains are not contracted from the left during the propagation operation. This contraction is done by a separate reset operation, comprising the activation of conductor R by reset driver 215 under the control of control circuit 312, before the reverse domain is completely propagated through the shift register.

Figure 6A:
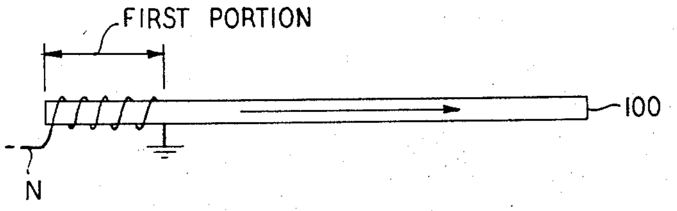
FIGS. 6A through 6G are illustrations of a magnetic wire of the arrangement of FIG. 5 showing various conductors coupled thereto and the magnetic condition of the magnetic wire in response to pulses applied to those conductors during operation.
Figure 6B:
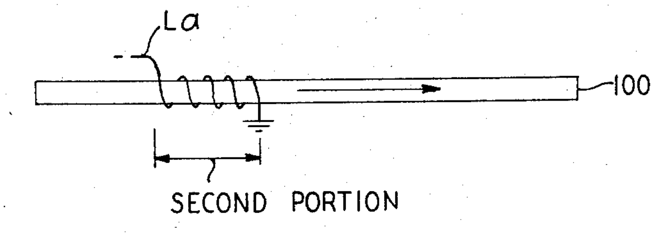
Figure 6C:
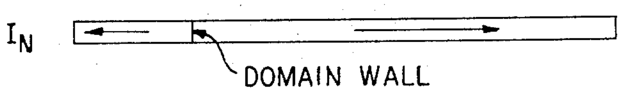

The foregoing operation is detailed in connection with FIGS. 6A through 6G. The figures show a representative magnetic wire 100 illustrating the magnetic condition thereof in response to the various fields generated therein by the pulses applied during operation. Initially, the magntic wire has all its flux aligned in one direction as illustrated by the arrow, directed to the right, as shown in FIG. 6A. Nucleation conductor N is shown coupled to a first portion of the wire 100. FIG. 6B shows wire 100 with a representative line *La* coupled thereto over a second portion thereof next adjacent the first portion as viewed in the figure. In response to a nucleation pulse $I_N$ applied to conductor N, a stable reverse domain is provided in the first portion. This is illustrated by the arrow directed to the left as viewed in FIG. 6C. The presence of an off-hook current $I_{OH}$ on the line *La* coincident with the nucleation pulse causes the domain wall, defined between the two oppositely poled domains, to move to the right to occupy the first and second portions of wire 100 as is clear from a comparison of FIGS. 6C and 6D.

Figure 6D:
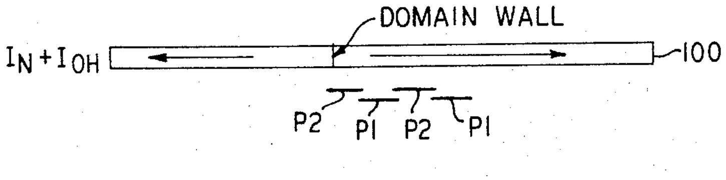
Figure 6E:
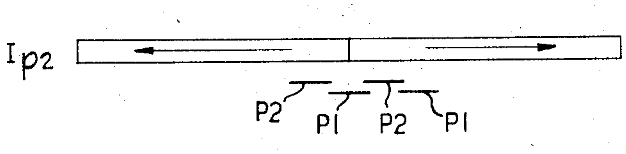

FIG. 6D illustrates the two propagation conductors, in cross section, as well as the wire 100. The propagation conductors are labeled P1 and P2; the current pulses applied thereto are designated $I_{P1}$ and $I_{P2}$, respectively. The expanded reverse domain shown in FIG. 6D is bounded to the right by a domain wall which can be seen to lie over a section of propagation conductor P2. The propagation conductors P2 and P1, thus, are positioned such that, when activated, they affect no domain wall to the left of the domain wall bounding the expanded domain and may be described as spaced apart from the first portion described. Importantly, the right boundary of the first portion coincides with a domain wall bounding the reverse domain generated there in response to a nucleation pulse in the absence of an off-hook pulse. Thus, the propagation means is spaced apart from the last mentioned domain wall and has a negligible effect thereon. A pulse $I_{P2}$ then is applied to propagation conductor P2 to move to the right the domain wall aligned with conductor P2 until that domain wall is in a position aligned with the propagation conductor P1. This movement is illustrated by a comparison of FIGS. 6D and 6E.

Figure 6F:
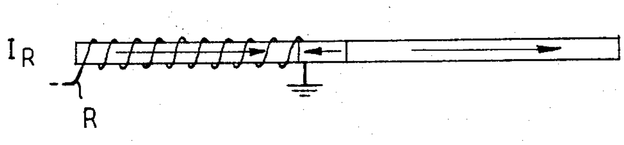
Figure 6G:
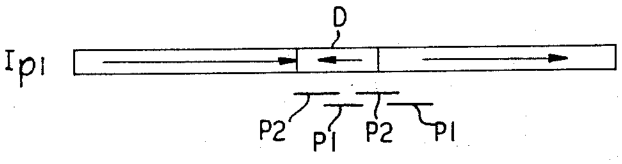

FIG. 6F shows the reset conductor R coupled to wire 100 over the first and second portions described. In practice conductor R wraps a mandrel on which all the wires are positioned and thus couples all wires at once rather than coupling them individually as shown. A pulse $I_R$ is applied to the reset conductor switching to a forward direction the flux in the first and second portions of wire 100 as illustrated by the arrow directed to the right there as shown in FIG. 6F. A reverse domain D of stable length remains to be propagated along the wire 100 in response to alternate pulses $I_{P1}$ and $I_{P2}$ applied to conductors P1 and P2, respectively. Propagation due to a (later) pulse $I_{P1}$ applied to conductor P1 is illustrated in FIG. 6G which also shows the stable reverse domain expanded to the right. Further propagation maintains constant this expanded length for the reverse domain D.

It may be appreciated that this type of arrangement is operable also if the nucleation pulse is applied to provide a reverse domain of unstable length. In this latter arrangement, a coincident off-hook current expands the domain to a stable length which domain then is propagated as described in connection with the embodiment of FIG. 5.

The operation of the circuit of FIG. 5 within the larger circuit as shown in FIG. 1 is apparent when it is realized that the various blocks of FIG. 5 function as do similarly designated blocks of FIG. 1. Thus, nucleation driver 214 functions as does nucleation driver 14 of FIG. 1, and advance clock driver 133 functions as does advance clock driver 33 of FIG. 1. Utilization circuit U is a generalized designation which includes, for example, the logic circuitry and the address generator 35 of FIG. 1. The various lines described in FIG. 5 correspond to the auxiliary telephone lines of FIG. 1. Of course, two shift registers of the type described in FIG. 5 may be used to fully implement the circuit of FIG. 1 alternative to the shift register described in connection with FIG. 2. Then, control circuit 312 may be understood as functioning as does central processor 12 of FIG. 1.

Whether a single wire or a multiple wire arrangement is used in the circuit of FIG. 1, stable reverse domains therein may have lengths of as little as about 100 mils with even shorter stable lengths provided by additional well known expedients. In the embodiment where a plurality of such domains are stored in one wire the domains are spaced apart typically by like lengths. For compatibility with existing telephone equipment, 1024 reverse domain positions, that is, scan points, are defined, for example, along a single magnetic wire in the embodiment of FIGS. 1 and 2. If the nonmagnetic wires are coiled about a nonmagnetic mandrel, then adjacent coils are spaced apart distances of about 50 mils. A suitable magnetic wire for such a shift register is a niobium-silver doped nickel-iron permalloy as described in copending application Ser. No. 405,696, now Patent No. 3,304,694 filed Oct. 22, 1964, for D. H. Smith and E. M. Tolman. Suitable registers of the domain wall magnetic wire type presently operate at speeds up to about 100 kilocycles. Suitable nucleation fields are about ten oersteds, propagation fields about one oersted accommodating off-hook currents varying from ten milliamperes to 100 milliamperes. The electrical loading, during the propagation operation, due to the coupling of even 1024 telephone auxiliary lines is negligible. The nucleation pulses typically have a duration of about ten microseconds and the propagation pulses have durations of about 25 microseconds, 4096 (4×1024) propagation pulses (1024 for multiple wire embodiment) being applied before the next subsequent nucleation pulse is applied. The inductances required for coupling to the magnetic wire of the shift register are so small that the telephone lines, in contradistinction with the auxiliary lines, may be coupled directly to the shift register. In this case, care is taken to avoid imbalance in the lines.

Rather than direct coupling between input lines and a magnetic wire herein, the input wires may be wrapped about, for example, a saturable magnetic element and the appropriate portion of the magnetic wire positioned within the field generated about the magnetic element.

In addition, it may be advantageous to gang shift registers, of the type shown in FIG. 2, in parallel on a mandrel for providing parallel read out. It may be appreciated that such an arrangement is very inexpensive since the cost of additional shift registers is little more than the cost of the magnetic wire used.

The invention has been described in terms of a particular type of shift register comprising an elongated propagation medium in which stable conditions are established in response to fields in excess of one value and along which those stable conditions are propagated in response to fields less than that value. Any shift register which so operates is useful in accordance with this invention.

What has been described is considered to be only illustrative of the principles of this invention. Accordingly, various and other arrangements may be devised by one skilled in the art without departing from the spirit and scope of this invention.

What is claimed is:

1. A scanning circuit comprising a shift register including first and second portions each having a plurality of stages, a plurality of input connections between subscriber substation lines and different stages of said first portion, means responsive to a first signal for enabling indications of line conditions to be stored in said stages of said first portion, propagation means responsive to said first signal for moving said indications in said shift register, said last-mentioned means being operative to move indications from said first to said second portions, means for controllably providing consecutive first signals, means responsive to first and second differences between indications in like stages of said first and second portions for selectively providing second and third signals, means synchronized with the movement of said indications in said register for generating address signals for consecutive subscriber substations, and means responsive to said second or third signals and said address signal for supplying first or second services to the corresponding substation respectively.

2. A scanning circuit in accordance with claim 1 wherein said shift register comprises magnetic material characterized by the ability to sustain therein a stable condition in response to a field above a first value and to propagate said condition therealong in response to a field of a second value less than said first.

3. A scanning circuit in accordance with claim 2 wherein said shift register comprises a single magnetic wire.

4. A scanning circuit in accordance with claim 2 wherein said shift register comprises a plurality of magnetic wires of different lengths.

5. A scanning circuit in accordance with claim 1 wherein said shift register comprises a magnetic wire characterized by the ability to sustain therein stable reverse domains in response to fields in excess of a first value and to propagate said domains therein in response to a field of a second value less than said first, and wherein said means for enabling comprises means for enabling the presence and absence of stable reverse magnetized domains indicative of first and second binary values in first positions in said wire.

6. In combination, a plurality of stations each capable of exhibiting a first or a second signal indicative of the active or inactive conditions of that station, utilization means for prvoiding first and second services to each of said stations responsive to third and fourth signals indicative of first and second differences, respectively, in the signals exhibited by each station in consecutive scan periods, and means for scanning periodically the conditions of said plurality of stations simultaneously, said last-mentioned means comprising a shift register including first and second portions each having a like number of stages, means responsive to an enabling signal from said utilization means for enabling the storage of first and second indications of the condition of each of said stations in an associated stage of said first portion and for activating a propagation means, propagation means for moving indications synchronously through said shift register, said last-mentioned means being operative to move stored indications from said first portion to said second portion when activated, means responsive to the arrival of said indications in said second portion to deactivate said propagation means, and means responsive to first and second differences between the indications in like stages of said first and second portions for providing said third and fourth signals.

7. A combination in accordance with claim 5 including means for providing the address of consecutive ones of said stations synchronously with consecutive ones of said third or fourth pulses.

8. A combination in accordance with claim 7 wherein said first and second portions of said shift register comprise a single magnetic wire.

9. A combination in accordance with claim 7 wherein one of said first and second portions comprises a plurality of magnetic wires of different lengths.

10. A scanning circuit in accordance with claim 1 wherein said shift register comprises a plurality of magnetic wires of different lengths, each of said wires being characterized by the ability to sustain therein stable reverse domains in response to a field in excess of a first value and to propagate said domains therealong in response to a field of a second value less than said first, wherein said means for enabling comprises means for enabling the presence and absence of stable reverse magnetized domains indicative of first and second binary values in a first position in each of said wires, including propagation means spaced apart from said first position sufficiently to have negligible effect on domains in said first position, and a plurality of lines each coupled to a second position on one of said wires, each of said second positions lying between one of said first positions and said propagating means so that a pulse in one of said lines expands the corresponding domain such that said propagating means only then is operative thereon.

11. In combination, a plurality of stations each capable of exhibiting a first or a second signal indicative of the active or inactive condition of that station, utilization means for providing first and second services to one of said stations responsive to third and fourth signals indicative of first and second differences, respectively, in the signals exhibited by that station in consecutive scan periods, and means for scanning periodically the conditions of said plurality of stations simultaneously, said last-mentioned means comprising a shift register having input and output stages, means responsive to an enabling signal for enabling the storage of first and second indications of the condition of each of said stations, propagation means moving indications synchronously from said input to said output stage in said shift register, means responsive to first and second differences between the indications in said input and output stages for providing said third and fourth signals.

12. An autonomous scanning circuit for indicating changes in signal conditions of each of a plurality of scan points, said circuit comprising a storage medium, means responsive to each of a succession of interrogate signals for storing simultaneously in said storage medium indications of the signal conditions of said scan points, means for comparing consecutive indications for each of said scan points, means responsive to changes in consecutive indications for each of said scan points for providing a condition change representation, and means responsive to each of said condition change representations for providing an output signal indicative of both that change and the address of the scan point in which that change occurred, said last-mentioned means comprising means for generating the addresses of said scan points sequentially and means responsive to each of said condition change representations for enabling said output signal.

13. An autonomous scanning circuit for indicating changes in signal conditions of each of a plurality of scan points and for providing the address of only those scan points at which a change occurs, said circuit comprising a storage medium, means responsive to each of a succession of interrogate signals for storing simultaneously in said storage medium indications of the signal conditions of said scan points, means for comparing consecutive indications for each of said scan points, means responsive to first and second changes in consecutive indications for each of said scan points for providing first and second condition change representations, means for generating the addresses of said scan points sequentially, and means responsive to each of said first and second condition change representations for gating the address of the scan point at which said change occurred.

14. An autonomous scanning circuit for indicating first and second changes in signal conditions of each of a plurality of scan points having first and second stable conditions and for providing an address signal for only those scan points at which a change in condition occurs, said circuit comprising means for generating an address signal for each of said scan points sequentially on each of first and second lines, and means for gating each of said address signals on said first and second lines responsive to first and second condition change representations respectively, said last-mentioned means comprising a storage medium, means responsive to each of a succession of interrogate signals for storing simultaneously in said medium indications of the signal conditions of said scan points, means for comparing consecutive indications for each of said scan points, and means responsive to first and second changes in said consecutive indications for each of said scan points for providing said first and second condition change representations.

15. A scanning circuit in accordance with claim 14 wherein said storage medium comprises a shift register having first and second multistage portions each including a stage associated with a different one of said scan points.

16. A scanning circuit in accordance with claim 14 wherein said storage medium comprises first and second multistage shift registers each including a stage associated with a different one of said scan points.

17. A scanning circuit in accordance with claim 15 wherein said shift register comprises a magnetic domain wall wire.

18. A scanning circuit in accordance with claim 17 wherein said scan points are defined in said wire by the coupling of substation auxiliary lines at different positions therealong.

19. A scanning circuit in accordance with claim 14 in combination with means responsive to an address signal on said first and second lines for providing first and second services respectively to the scan point identified by that address signal.

References Cited

UNITED STATES PATENTS

| | | | |
|---|---|---|---|
| 3,231,683 | 1/1966 | Lowry et al. | |
| 3,090,946 | 5/1963 | Bobeck | 340—174 |
| 3,138,720 | 6/1964 | Glore | 179—18.3 |
| 3,241,127 | 3/1966 | Synder | 340—174 |

WILLIAM C. COOPER, *Primary Examiner.*

ALBIN H. GESS, *Assistant Examiner.*